T. J. GEE.
WIND STACKER.
APPLICATION FILED APR. 14, 1914.
1,152,805.
Patented Sept. 7, 1915.
2 SHEETS—SHEET 1.
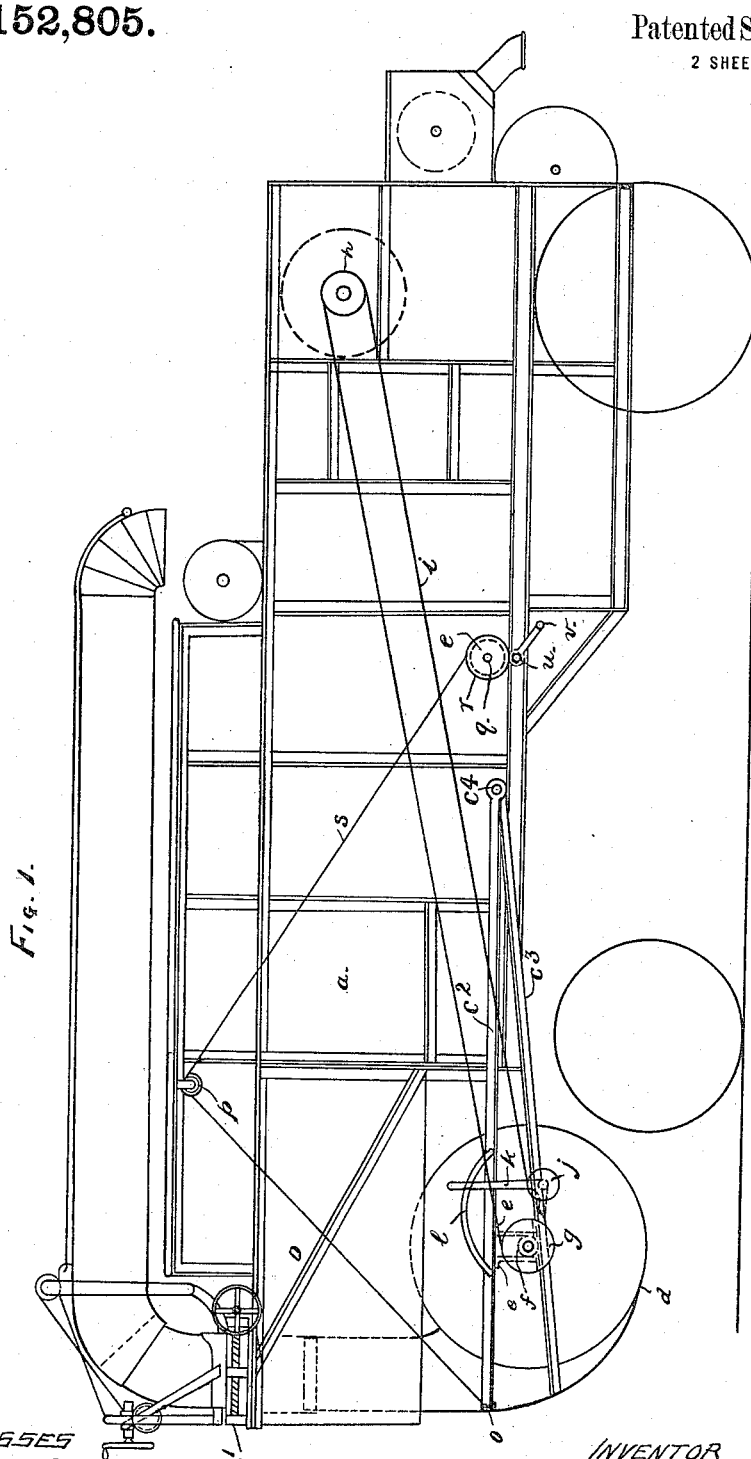
WITNESSES
Alfred R. Anderson
Cornelius Hoving
INVENTOR
T. J. GEE
BY H van Oldenmal
ATTORNEY T. J. GEE.
WIND STACKER.
APPLICATION FILED APR. 14, 1914.
1,152,805.
Patented Sept. 7, 1915.
2 SHEETS—SHEET 2.
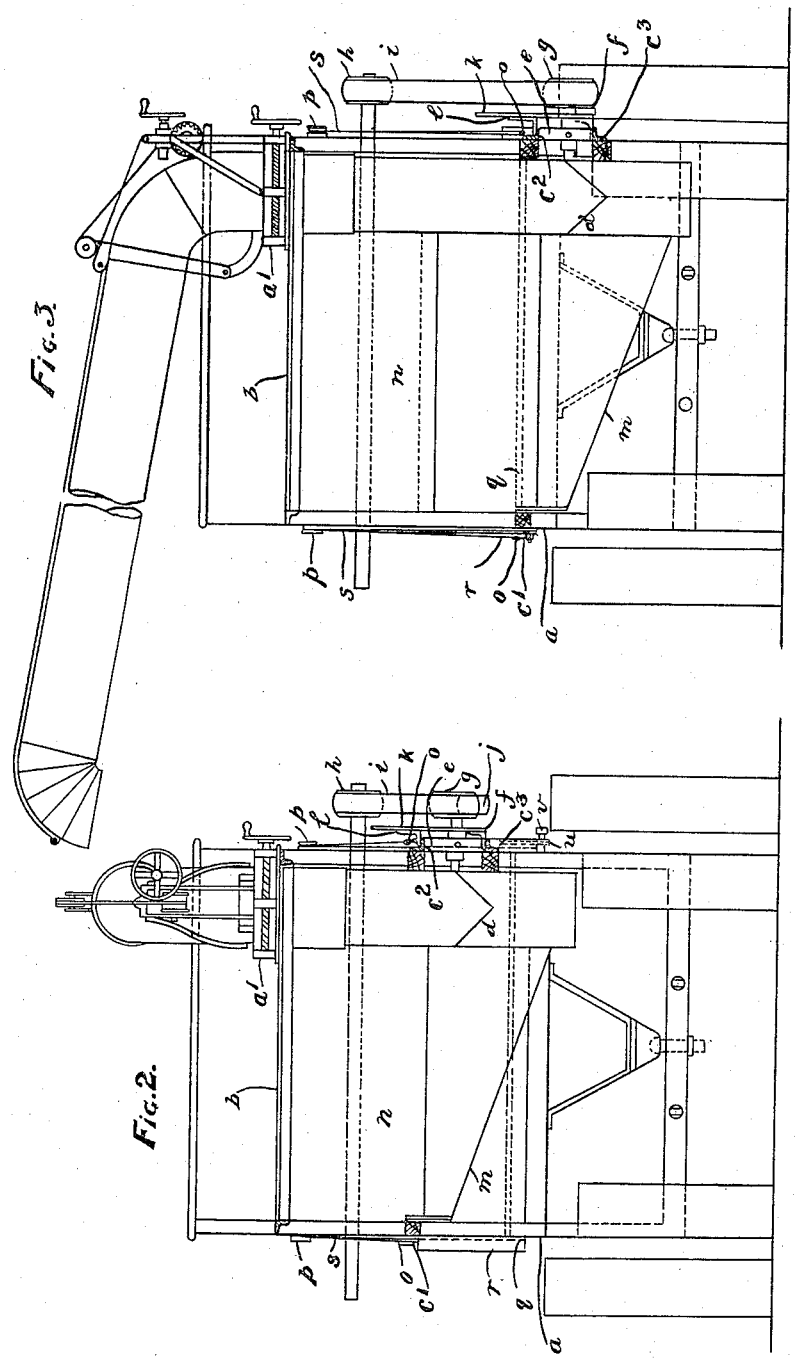
WITNESSES
Alfred R. Anderson
Cornelius Hoving
INVENTOR
T. J. GEE
BY H van Oldenneel
ATTORNEY

UNITED STATES PATENT OFFICE.

THOMAS JOHN GEE, OF BUENOS AIRES, ARGENTINA.

WIND-STACKER.

1,152,805. Specification of Letters Patent. Patented Sept. 7, 1915.

Application filed April 14, 1914. Serial No. 831,700.

*To all whom it may concern:*

Be it known that I, THOMAS JOHN GEE, a subject of the King of the United Kingdom of Great Britain and Ireland, and resident of Buenos Aires, Argentina, have invented a certain new and useful Improvement in Wind-Stackers, of which the following is a specification.

This invention relates to windstackers for threshing machines, maize-shellers and the like, being an improvement on or modification of the construction described in the specification of Letters Patent No. 1031706, hereinafter referred to as the said prior specification.

As will appear from what follows, the present invention includes several advantageous features which represent the result of practical experience and the development of which has been influenced by the desiderata of reduction in the cost of manufacture of the windstacker and reduction of the power required for operation.

In accordance with the invention the pivoted frame which carries the windstacker is arranged also to support the bearings of the fan spindle so that the casing, being relieved from strain, may be of lighter and less expensive construction. With a view to simplifying and cheapening the lifting and lowering mechanism for the windstacker, there is now employed for lifting the windstacker a winding mechanism comprising a drum shaft fitted with drums on which may be wound cables connected to the pivoted frame. The disposition of the windstacker fan is also modified, the discharge pipe from the fan casing being directed vertically upward in lieu of horizontally as heretofore, and the casing being set nearer to the center of the machine so as to avoid the lateral overhang of the windstacker and associated parts from the machine frame.

In the accompanying drawing, Figure 1 is a side elevation of a threshing machine equipped with a windstacker embodying the present improvements. Fig. 2 is an end elevation showing the windstacker raised ready for traveling. Fig. 3 is an end elevation showing the windstacker in lowered position ready for use.

Referring to the drawing, $b$ is the windstacker extension fitted to one end of the threshing machine structure $a$ and adapted to carry the turntable $a^1$. Pivoted to the body of the machine structure $a$ are arms $c^1$, $c^2$ and $c^3$, the arm $c^1$ being disposed at one side of the machine, and the arms $c^2$ and $c^3$ being disposed at the opposite side and strung upon a common pivot $c^4$ in alinement with that of the arm $c^1$. The fan casing $d$ is interposed between the arm $c^1$ and the arms $c^2$ and $c^3$, the said arms and casing thus forming a framework which is adapted to be raised and lowered by the cables $s$ secured to the eyebolts $o$ and passing over guide pulleys $p$ and around the winding drums $r$ mounted on the cross-shaft $q$. The winding drums $r$ are adapted to be operated by means of a manually operable lever $v$ and pinion $u$ in gear with a second pinion $t$ keyed to the cross-shaft $q$.

$h$ is a driving pulley from which an open belt $i$ passes to a pulley $g$ keyed to the fan spindle, said spindle being supported by bearings $f$ secured to the brackets $e$, whereby the fan casing is relieved from strain. The tension of the belt $i$ is regulated by the fly pulley $j$ fitted on a spindle secured to the bell crank lever $k$, one arm of which lever is pivoted on the arm $c^3$ and the other arm of which lever is guided and held in any desired position of adjustment by the quadrant $l$ secured to the arm $c^2$.

A hopper $m$ secured to the framework serves to conduct to the fan the straw and chaff fed to such hopper by the guide plate $n$. The hopper is thus lifted and lowered simultaneously with the fan casing.

The extension and framework are constructed of angle irons as shown in the drawings.

What I claim is:—

1. In a threshing machine, maize-sheller or the like, a windstacker including a frame pivoted to the machine structure, said frame including two arms at one side of the machine structure mounted on a common pivot, and an arm at the opposite side of said structure mounted on a pivot coaxial with the first mentioned pivot, brackets by which said first mentioned arms are spaced, a fan casing secured to said frame, a hopper also secured to said frame for leading straw and chaff to said casing, spindle bearings secured to said brackets, and means connected to an arm at each side of said structure for raising and lowering said frame and therewith said casing and hopper.

2. In a threshing machine, maize-sheller or the like, a windstacker including a frame pivoted to the machine structure, said frame including two arms mounted on a common pivot at one side of the machine structure, an arm at the opposite side of said structure mounted on a pivot coaxial with the first mentioned pivot, brackets spacing said first mentioned arms, a fan casing supported by said frame, the discharge pipe of said casing being directed substantially vertically upward, a hopper also secured to said frame, fan spindle bearings secured to said brackets, and means connected to an arm at each side of said structure for raising and lowering said frame, and therewith said casing and said hopper.

3. In a threshing machine, maize-sheller or the like, a windstacker including a frame pivoted to the machine structure, said frame including relatively inclined arms at one side of the machine structure, brackets by which said arms are spaced, a single arm at the opposite side of said structure, all said arms mounted for angular movement around a common axis, a fan casing supported by said frame intermediate said arms, the discharge pipe of said casing being directed substantially vertically upward, a hopper also secured to said frame, fan spindle bearings secured to said brackets, and means for raising and lowering said frame, and therewith said casing and said hopper, said raising and lowering means including members one on each side of said structure, said members conjointly rotatable on a common axis, cables led from arms on both sides of said structure to said rotatable members, to effect simultaneous angular movement of all said arms, a manually operable actuating member, and means for transmitting movement from said actuating member to said rotatable members.

4. In a threshing machine, maize-sheller or the like, a windstacker including a frame pivoted to the machine structure, said frame including relatively inclined arms at one side of the machine structure, brackets by which said arms are spaced, a single arm at the opposite side of said structure, all said arms being angularly movable around a common axis, a fan casing supported by said frame, the discharge pipe of said casing being directed substantially vertically upward, a hopper also secured to said frame, fan spindle bearings secured to said brackets, means connected to an arm at each side of said structure for raising and lowering said frame, and therewith said casing and said hopper, a fan spindle journaled in said bearings, a driven pulley on said spindle, a driving pulley revoluble around a fixed axis eccentric to the axis of angular movement of said arms, a belt for transmitting movement from said driving pulley to said driven pulley and a belt-tensioning device carried by said frame close to said driven pulley.

In testimony whereof I have signed my name to this specification in the presence of two subscribing witnesses.

THOMAS JOHN GEE.

Witnesses:
 ALBERT EDWARD CAMMELL,
 SIDNEY STONE.

Copies of this patent may be obtained for five cents each, by addressing the "Commissioner of Patents, Washington, D. C."